United States Patent [19]
Christie

[11] Patent Number: 6,055,650
[45] Date of Patent: Apr. 25, 2000

[54] PROCESSOR CONFIGURED TO DETECT PROGRAM PHASE CHANGES AND TO ADAPT THERETO

[75] Inventor: David S. Christie, Austin, Tex.

[73] Assignee: Advanced Micro Devices, Inc., Sunnyvale, Calif.

[21] Appl. No.: 09/056,005

[22] Filed: Apr. 6, 1998

[51] Int. Cl.[7] .................................................. G06F 11/30
[52] U.S. Cl. ................................................. 714/39; 710/15
[58] Field of Search .................................. 712/1; 710/14, 710/15, 18, 19; 714/39, 47; 395/704

[56] References Cited

U.S. PATENT DOCUMENTS

| | | | |
|---|---|---|---|
| 5,361,391 | 11/1994 | Westberg | 711/137 |
| 5,367,656 | 11/1994 | Ryan | 395/425 |
| 5,452,440 | 9/1995 | Salsburg | 714/47 |
| 5,537,573 | 7/1996 | Ware et al. | 711/137 |
| 5,586,293 | 12/1996 | Baron | 710/22 |
| 5,649,156 | 7/1997 | Vishlitzky | 395/463 |
| 5,691,920 | 11/1997 | Levine | 364/551.01 |
| 5,719,800 | 2/1998 | Mittal | 364/707 |
| 5,727,167 | 3/1998 | Dwyer, III | 395/280 |
| 5,729,713 | 3/1998 | Leyrer | 395/465 |
| 5,796,939 | 8/1998 | Berc | 714/47 |
| 5,862,371 | 1/1999 | Levine | 712/228 |

OTHER PUBLICATIONS

PowerPC™ Microprocessor Developer's Guide, pp. 212–213, published 1995 by SAMS Publishing, Indianapolis, Indiana.

*Primary Examiner*—Eric Coleman
*Attorney, Agent, or Firm*—Conley, Rose & Tayon, P.C.; Lawrence J. Merkel

[57] ABSTRACT

A phase change monitor monitors one or more processor resources to detect a phase change in the program being executed. The phase change monitor signals a prefetch unit to indicate the detected phase change, and may also provide information regarding the phase being entered (as detected by the phase change monitor). The prefetch unit is configured to selectively prefetch in response to the detected phase changes. Prefetching may be tailored to the detected phases. The prefetch unit may disable a current prefetch generated during a previous phase upon detection of the phase change, and a new prefetch may be initiated for the phase being entered. Since the phase being entered may operate upon different data sets, the current prefetch may be less likely to be prefetching data which is subsequently accessed. Terminating the current prefetch upon detection of a phase change may reduce the number of prefetches which are no subsequently accessed. Accordingly, bandwidth to external memory is not consumed by the unused prefetches and hence may be available for other memory operations.

18 Claims, 6 Drawing Sheets

| Change | Prefetch Modification |
| --- | --- |
| ITLB Miss Rate Exceeds Threshold | Disable Current Prefetch |
| Branch Misprediction Rate Exceeds Threshold | Disable Current Prefetch |
| DTLB Miss Rate Exceeds Threshold | Disable Current Prefetch, Enable Prefetch in Missing Page |
| Cache Miss Rate Exceeds Threshold | Disable Current Prefetch, Enable Prefetch at Missing Cache Lines |
| Reorder Buffer Depth Exceeds Threshold | Disable Current Prefetch |
| Frequency of Floating Point Instructions Exceeds Threshold | Disable Current Prefetch, Enable Prefetch from Floating Point Data Accesses |
| Frequency of Floating Point Instructions Falls Below Threshold | Disable Current Prefetch, Enable Prefetch from Integer Data Accesses |
| Frequency of Multimedia Instructions Exceeds Threshold | Disable Current Prefetch, Enable Prefetch from Multimedia Data Accesses |
| Frequency of Multimedia Instructions Falls Below Threshold | Disable Current Prefetch, Enable Prefetch from Integer Data Accesses |
| Frequency of Negative Displacement Branches Exceeds Threshold | Disable Current Prefetch, Enable Prefetch from Accesses if Loop Count Exceeds Threshold |

PROCESSOR CONFIGURED TO DETECT PROGRAM PHASE CHANGES AND TO ADAPT THERETO

BACKGROUND OF THE INVENTION

1. Field of the Invention

This invention relates to the field of processors and, more particularly, to prefetching mechanisms within processors.

2. Description of the Related Art

Superscalar processors achieve high performance by executing multiple instructions per clock cycle and by choosing the shortest possible clock cycle consistent with the design. On the other hand, superpipelined processor designs divide instruction execution into a large number of subtasks which can be performed quickly, and assign pipeline stages to each subtask. By overlapping the execution of many instructions within the pipeline, superpipelined processors attempt to achieve high performance.

Superscalar processors demand low memory latency due to the number of instructions attempting concurrent execution and due to the increasing clock frequency (i.e. shortening clock cycle) employed by the superscalar processors. Many of the instructions include memory operations to fetch (read) and update (write) memory operands. The memory operands must be fetched from or conveyed to memory, and each instruction must originally be fetched from memory as well. Similarly, superpipelined processors demand low memory latency because of the high clock frequency employed by these processors and the attempt to begin execution of a new instruction each clock cycle. It is noted that a given processor design may employ both superscalar and superpipelined techniques in an attempt to achieve the highest possible performance characteristics.

Processors are often configured into computer systems which have a relatively large, relatively slow main memory. Typically, multiple dynamic random access memory (DRAM) modules comprise the main memory system. The large main memory provides storage for a large number of instructions and/or large amount of data for use by the processor, providing faster access to the instructions and/or data than may be achieved from a disk storage, for example. However, the access times of modern DRAMs are significantly longer than the clock cycle length of modern processors. The memory access time for each set of bytes being transferred to the processor is therefore long. Accordingly, the main memory system is not a low latency system. Processor performance may suffer due to high memory latency.

In order to allow low latency memory access (thereby increasing the instruction execution efficiency and ultimately processor performance), computer systems typically employ one or more caches to store the most recently accessed data and instructions. Additionally, the processor may employ caches internally. A relatively small number of clock cycles may be required to access data stored in a cache, as opposed to a relatively larger number of clock cycles required to access the main memory.

Low memory latency may be achieved in a computer system if the cache hit rates of the caches employed therein are high. An access is a hit in a cache if the requested data is present within the cache when the access is attempted. On the other hand, an access is a miss in a cache if the requested data is absent from the cache when the access is attempted. Cache hits are provided to the processor in a small number of clock cycles, allowing subsequent accesses to occur more quickly as well and thereby decreasing the effective memory latency. Cache misses require the access to receive data from the main memory, thereby increasing the effective memory latency.

In order to increase cache hit rates, computer systems may employ prefetching to "guess" which data will be requested by the processor in the future. The term prefetch, as used herein, refers to transferring data (e.g. a cache line) into a cache prior to a request for the data being received by the cache in direct response to executing an instruction (either speculatively or non-speculatively). A request is in direct response to executing the instruction if the definition of the instruction according to the instruction set architecture employed by the processor includes the request for the data. A "cache line" is a contiguous block of data which is the smallest unit for which a cache allocates and deallocates storage. If the prefetched data is later accessed by the processor, then the cache hit rate may be increased due to transferring the prefetched data into the cache before the data is requested.

Unfortunately, prefetching can consume memory bandwidth at an inopportune time with respect to the occurrence of non-speculative memory operations. For example, a prefetch memory operation may be initiated just slightly prior to the initiation of a non-prefetch memory operation. As the prefetch memory operation is occupying the memory system already, the latency of the non-prefetch memory operation is increased by the amount of time the memory system is occupied with the prefetch request. Particularly if the prefetch is incorrect (i.e. the prefetched data is not used later by the requester), the increased latency may decrease performance of the processor (and the overall computer system).

SUMMARY OF THE INVENTION

The problems outlined above are in large part solved by a phase change monitor for a processor in accordance with the present invention. The phase change monitor monitors one or more processor resources to detect a phase change in the program being executed. The phase change monitor signals a prefetch unit to indicate the detected phase change, and may also provide information regarding the phase being entered (as detected by the phase change monitor). The prefetch unit is configured to selectively prefetch in response to the detected phase changes. Advantageously, prefetching may be tailored to the detected phases. The prefetch unit may disable a current prefetch generated during a previous phase upon detection of the phase change, and a new prefetch may be initiated for the phase being entered. Since different phases may operate upon different data sets or exhibit other differing execution behavior, tailoring the prefetch to each phase may result in prefetching which is more accurate for that phase. Accordingly, processor resource usage may be more efficient.

Detecting the phase change may provide a termination for the current prefetch, as mentioned above. Since the phase being entered may operate upon different data sets, the current prefetch may be less likely to be prefetching data which is subsequently accessed. Terminating the current prefetch upon detection of a phase change may reduce the number of prefetches which are not subsequently accessed. Accordingly, bandwidth to external memory is not consumed by the unused prefetches and hence may be available for other memory operations. Performance of a processor employing the phase change monitor may be increased both by the more accurate prefetching provided by tailoring prefetching to the program phase and by the elimination of unused prefetches.

Broadly speaking, the present invention contemplates a processor comprising one or more processor resources, a phase change monitor, and a prefetch unit. The phase change monitor is coupled to the processor resources, and is configured to detect a phase change in a program being executed by monitoring the processor resources. Coupled to the phase change monitor, the prefetch unit is configured to selectively prefetch responsive to the phase change monitor.

The present invention further contemplates a method for prefetching in a processor executing a program. One or more processor resources are monitored to detect a phase change in the program. A prefetch is selectively enabled responsive to the phase change.

Moreover, the present invention contemplates a computer system comprising a processor, a memory, and an input/output (I/O) device. The processor is configured to execute a program, and is configured to monitor one or more processor resources to detect a phase change in the program. Responsive to detecting the phase change, the processor is configured to selectively prefetch. Coupled to the processor, the memory is configured to store instructions and data for access by the processor. Also coupled to the processor, the I/O device is configured to communicate between the computer system and a second computer system coupled to the I/O device.

BRIEF DESCRIPTION OF THE DRAWINGS

Other objects and advantages of the invention will become apparent upon reading the following detailed description and upon reference to the accompanying drawings in which:

FIG. 5 is a table illustrating processor resources and the feature thereof monitored by one embodiment of the phase change monitor shown in FIG. 3.

Figure 1:
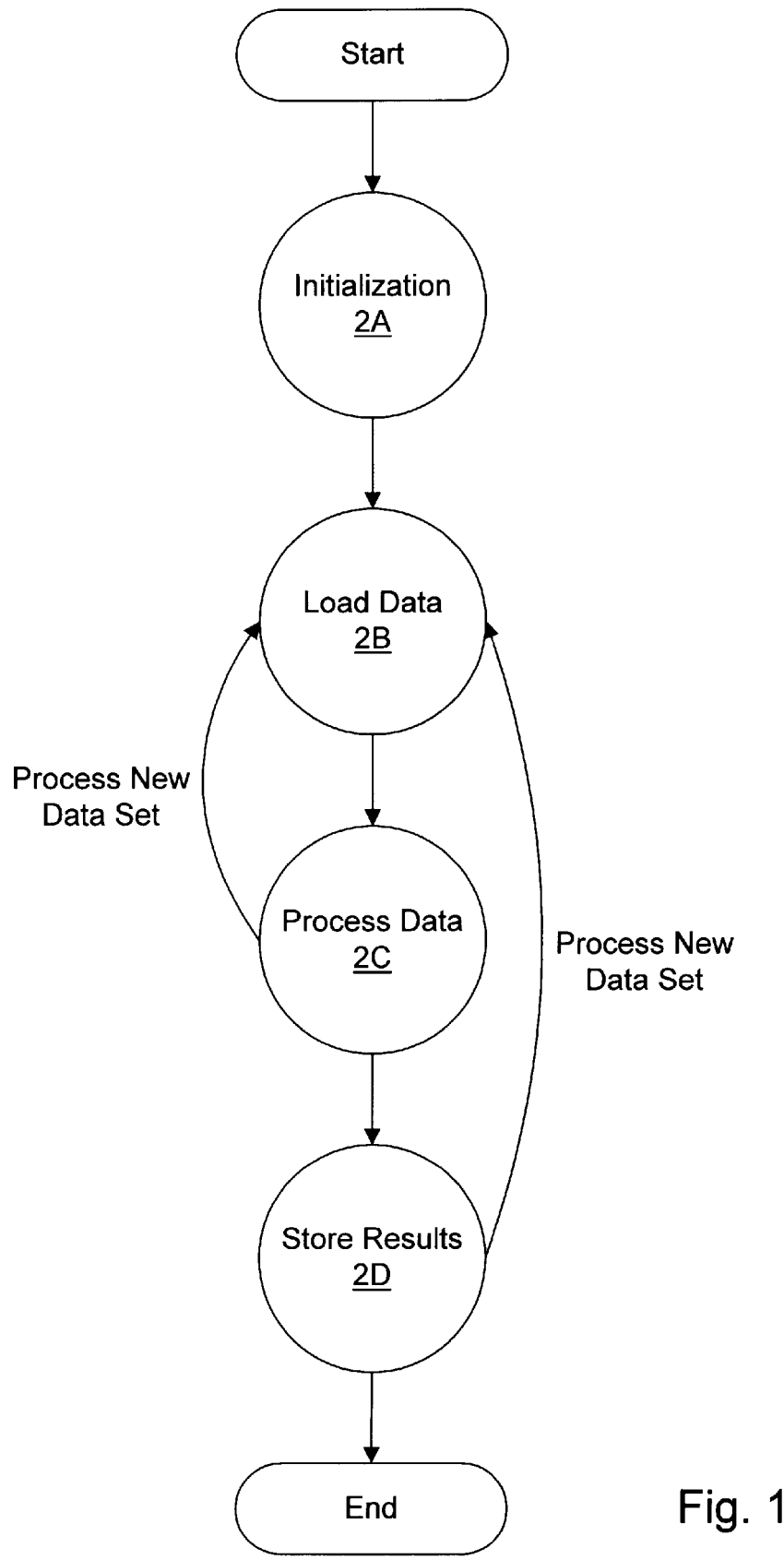
FIG. 1 is a diagram illustrating a first exemplary set of phases for a program.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a diagram illustrating a plurality of phases 2A–2D of a program is shown. A program to be executed by one or more processors in a computer system may be viewed as having a variety of phases. Generally, a "phase" of a program is a portion of the program which exhibits an execution behavior which differs substantially from other phases of the program. The differences in execution behavior may be static, such as the instruction mix (i.e. the frequency of various types of instructions such as integer, floating point, and multimedia instructions) included in the phase differing from that of the other phases, and/or the data sets actively manipulated by the phase differing from that of the other phases. The differences in execution behavior may also be dynamic, such as the frequency of branch behavior (taken/not taken) within the phase. Large differences in branch behavior between phases may mean that the branch prediction information accumulated during execution of one phase does not result in successful branch prediction during execution of another phase.

Phases 2A–2D illustrate general phases that many types of application programs may include. An application program is a program developed for direct use by a user. Typically, the application program is designed to operate within a computer system environment managed by an operating system. The operating system provides low level device management, allowing application programs to simply call an operating system routine when access to a particular hardware device included in the computer system is needed. The operating system insulates the application program from the large variety of hardware which may be included in various computer systems. Additionally, the operating system provides various commonly needed services, so that each application program need not include code to provide those services. Still further, the operating system may provide system stability in the case that an application program operates in an erroneous fashion. The computer system may be protected from unintended consequences of a faulty program.

Initialization phase 2A is executed upon entering the application program. During initialization phase 2A, the program may be requesting services from the operating system to allocate memory and other system functionality for use by the program. The program may place default values into a variety of variables used by the program, open files stored on a hard drive or other non-volatile storage medium, initialize user programmable default settings, etc. Accordingly, the initialization phase may be characterized by numerous calls to the operating system and file input/output (I/O). The initialization phase may execute in a very similar manner each time the program is executed, in contrast with other phases which may execute in a variety of fashions based on user input.

Upon completion of initialization phase 2A, the program moves to load data phase 2B. Load data phase 2B is used to read a data set selected by the user for processing. Generally, load data phase 2B involves file input from a file stored on a selected non-volatile storage device such as a fixed or removable disk, CD-ROM, etc. Input may also be received manually through a keyboard or from another computer system via a communications device such as a modem or network interlace card.

Completing phase 2B, the program moves to process data phase 2C. In process data phase 2C, the program manipulates the data set provided during phase 2B. A variety of processing may be performed in phase 2C, generally producing results which the user considers desirable. The results may be stored to one or more output files in a store results phase 2D.

A user may desire to operate upon multiple data sets concurrently, or to access data in one data set for inclusion in another data set. Accordingly, a transition from process data phase 2C to load data phase 2B may occur upon a command to process a new data set. Similarly, upon storing results from one data set, a user may decide to operate upon another data set. A transition from store results phase 2D to load data phase 2B is therefore provided.

Yet another phase, (not shown) may be included in programs for exiting the program. In the exit phase, the program may free any system resources (e.g. memory) allocated to the program during execution so that the resources may be allocated to another program subsequently or concurrently executing. Additionally, any phase may include operating system calls which are, effectively, temporary phase transitions as the operating system does not often access data manipulated by the program and the operating system routines are generally stored in physically separate memory locations from the instructions included in the phases. Still further, phases may be interrupted by a multi-tasking type operating system to allow other programs to execute.

Figure 2:
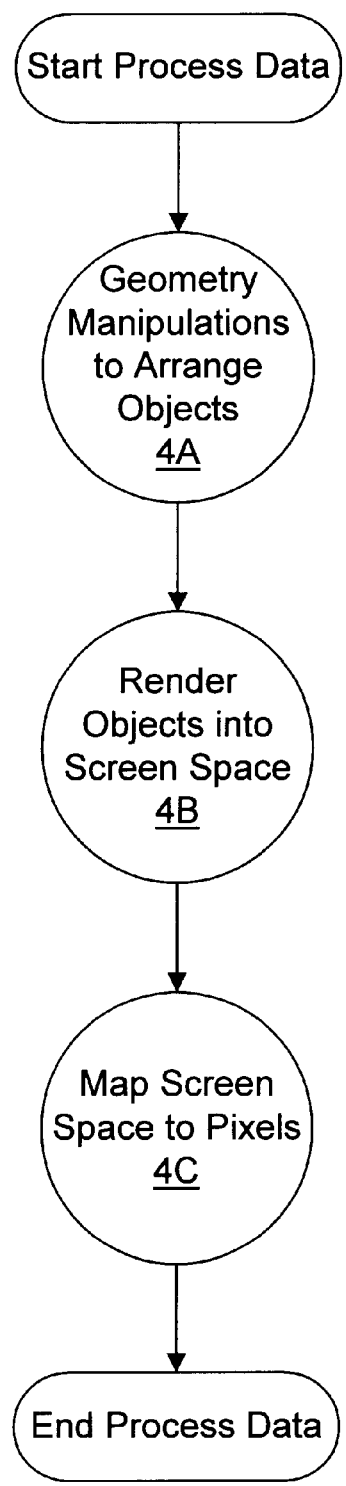
FIG. 2 is a diagram illustrating a second exemplary set of phases for a program which performs graphics operations.

Any of the phases shown in FIG. 1 may comprise a variety of phases in a given program. For example, an exemplary set of phases 4A–4C is illustrated in FIG. 2. The set of phases 4A–4C may comprise a portion of process data phase 2C in FIG. 1 for a program which performs graphics processing of graphics objects into pixels for display upon a video display in the computer system. Phases 4A–4C are provided a set of graphics objections defined in a three dimensional coordinate space (often referred to as model space), and provides a pixel map for transfer to the video display.

Phase 4A performs geometric manipulations upon the objects to arrange the objects with respect to a particular viewpoint within the three dimensional coordinate system. Objects which are not visible (because they are behind the viewpoint or because the are hidden by another, non-transparent object) are removed and other graphics manipulations might be performed. Phase 4A is often floating point intensive in modern graphics systems.

Phase 4B renders the objects into "screen space", a coordinate system in which the screen is the origin of the system. Vertical and horizontal measurements (X and Y) define displacements upon the screen, and a depth axis (Z) defines distance from the screen.

Phase 4C maps the screen space into pixels for display upon the display screen. Since the number of pixels is finite, often times two objects of different colors would be represented within a pixel. These conflicts are resolved and a color for each pixel is selected. Subsequent to mapping the screen space into pixels, the map of pixels is transferred to a graphics controller for display via store results phase 2D.

The inventor has realized that, while a program is executing within a particular phase, the processor resources provided for accelerating instruction execution often perform well. Generally, a "processor resource" is circuitry designed to perform a particular function which either (i) accelerates instruction execution, or (ii) provides instruction execution functionality. For example, cache and translation lookaside buffer (TLB) hit rates are high, branch misprediction rates are low, etc. Furthermore, prefetching based upon data access patterns observed within the particular phase may increase the effectiveness of the processor resources. However, during periods of phase change the processor resources are much less effective. Often, the instructions which comprise a phase are stored within one or a small number of pages, and the translations for these pages are entered in the translation lookaside buffer early in the phase. Subsequently, instruction TLB hit rates are high. However, the instructions which comprise the phase being entered may be stored in different pages having different translations. Furthermore, the instructions are even more likely to be stored in different cache lines than the instructions comprises the phase being exited. Accordingly, instruction cache and TLB hit rates may suffer during times of phase change.

Still further, since different phases often manipulate different data sets, data cache and TLB hit rates may suffer. Since the prefetching being performed at the time of a phase change is based upon data and instructions in the phase being exited, the prefetching may no longer be appropriate for the operation of the phase being entered.

In response to these realizations, a phase change monitor is contemplated for a processor. The phase change monitor monitors various processor resources. If the processor resources exhibit signs that a phase change is occurring, the phase change monitor signals a prefetch unit employed within the processor. The prefetch unit may thereby be informed of the phase change, and may modify prefetching responsive to the phase change. For example, since the prefetching in progress (the "current prefetch") is likely to no longer be suitable, the prefetch unit may be configured to disable the current prefetch. Additionally, depending upon the information detected during the phase change, a new prefetch may be initiated. Advantageously, prefetching may be tailored to each phase of program execution. Since the prefetching is tailored to the phase, the prefetching may be more likely to be accurate and increase cache hit rates. Furthermore, the prefetching may be less likely to consume external memory bandwidth needed by non-prefetch operations. Furthermore, detection of the phase change allows disabling of the current prefetch. Previously, it has often difficult to determine when to end a particular prefetch once it has been initiated.

Figure 3:
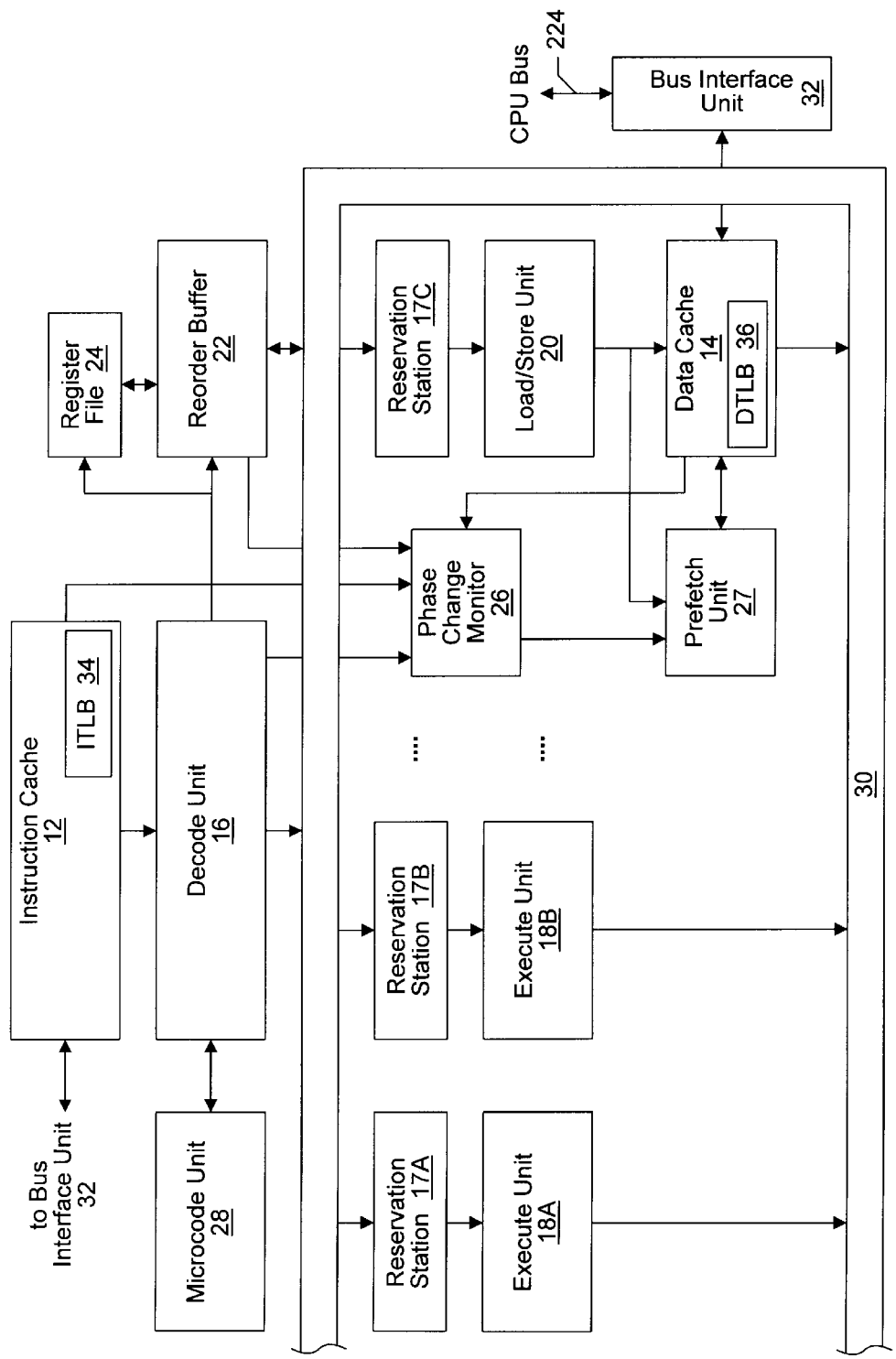
FIG. 3 is a block diagram of a one embodiment of a superscalar processor.

Turning now to FIG. 3, a block diagram of one embodiment of a processor 10 is shown. Other embodiments are possible and contemplated. As shown in FIG. 3, processor 10 includes an instruction cache 12, a data cache 14, a decode unit 16, a plurality of reservation stations including reservation stations 17A, 17B, and 17C, a plurality of execute units including execute units 18A and 18B, a load/store unit 20, a reorder buffer 22, a register file 24, a phase change monitor 26, a prefetch unit 27, a microcode unit 28, a bus interface unit 32, an instruction translation lookaside buffer (ITLB) 34, and a data TLB (DTLB) 36. Elements referred to herein with a particular reference number followed by a letter will be collectively referred to by the reference number alone. For example, the plurality of execute units will be collectively referred to herein as execute units 18. Execute units 18 may include more execute units than execute units 18A and 18B shown in FIG. 3. Additionally, an embodiment of processor 10 may include one execute unit 18.

As shown in FIG. 3, instruction cache 12 is coupled to bus interface unit 32 and to decode unit 16, which is further coupled to reservation stations 17, reorder buffer 22, register file 24, and microcode unit 28. Reorder buffer 22, execute units 18, and data cache 14 are each coupled to a result bus 30 for forwarding, of execution results. Furthermore, each reservation station 17A and 17B is coupled to a respective execute unit 18A and 18B, while reservation station 17C is coupled to load/store unit 20. Each reservation station 17 is coupled to receive operand information from reorder buffer 22. Load/store unit 20 is coupled to data cache 14, which is further coupled to bus interface unit 32. Additionally, phase change monitor 26 is coupled to data cache 14, prefetch unit 27, reorder buffer 22, instruction cache 12, and decode unit 16. Still further, prefetch unit 27 is coupled to phase change monitor 26, load/store unit 20, and data cache 14. Instruction cache 12 includes ITLB 34, and data cache 14 includes DTLB 36. Bus interface unit 32 is coupled to a CPU bus 224.

Generally speaking, phase change monitor 26 is configured to monitor a variety of processor resources to detect a phase change in a program being executed. Upon detecting a phase change, phase change monitor 26 signals prefetch unit 27. Additionally, for certain phase change detections, phase change monitor 26 indicates what type of prefetching may be initiated for the phase being entered. Additional details regarding one embodiment of phase change monitor 26 are provided below with respect to FIGS. 4 and 5.

In one embodiment, phase change monitor receives instruction cache miss and instruction TLB miss information from instruction cache 12, data cache miss and data TLB miss information from data cache 14, reorder buffer depth and branch misprediction information from reorder buffer 24, and instruction type information (including integer, floating point, multimedia, and branch with negative displacement information) from decode unit 16. Phase change monitor 26 may then monitor instruction and data cache and TLB miss rates, reorder buffer depth, branch misprediction rates, and frequencies of instruction types to detect phase changes. Other embodiments may monitor any subset of the above mentioned features, and any additional processor resources, as desired.

Prefetch unit 27 is coupled to receive memory operation information (including the address of the memory operation, the type of memory operation, etc.) from load/store unit 20 as load/store unit 20 conveys the memory operation information to data cache 14. Prefetch unit 27 may generate prefetches based upon the received memory operation information, responsive to signalling from phase change monitor 26. For example, prefetch unit 27 may be configured to prefetch the next consecutive cache line to the cache line accessed via a memory operation if the memory operation is to be prefetched as indicated by information from phase change monitor 26. Other embodiments may employ other prefetch algorithms, such as stride based algorithms.

In one particular embodiment, load/store unit 20 conveys the type of instruction for which the memory operation is being performed (e.g. floating point, multimedia, or integer). Phase change monitor 26 may be configured to monitor the frequency of instruction types and to signal prefetching for memory operations corresponding to instructions of the most frequent type. For such embodiments, the type information from load/store unit 20 may allow prefetch unit 27 to determine which memory operations are eligible for prefetch in the current phase. Accordingly, if phase change monitor 26 detects that, for example, the frequency of floating point instructions has exceeded a predetermined threshold, phase change monitor 26 may signal that prefetching of floating-point type memory operations is desirable. Prefetch unit 27 may then generate prefetches upon receiving floating point memory operations from load/store unit 20.

Instruction cache 12 is a high speed cache memory for storing instructions. It is noted that instruction cache 12 may be configured into a variety of configurations including a set-associative or direct mapped configuration. Instruction cache 12 may additionally include a branch prediction mechanism for predicting branch instructions as either taken or not taken. Instructions are fetched from instruction cache 12 and conveyed to decode unit 16 for decode and dispatch to a reservation station 17. Instruction cache 12 includes ITLB 34 for storing instruction address translations from a virtual address to a physical address. In one embodiment, processor 10 employs the x86 processor architecture and the virtual addresses are linear addresses.

Decode unit 16 decodes each instruction fetched from instruction cache 12. Decode unit 16 dispatches the instruction to one or more of reservation stations 17 depending upon the type of instruction detected. For example, if a given instruction includes a memory operand, decode unit 16 may signal load/store unit 20 to perform a load/store (i.e. read/write) memory operation in response to the given instruction.

Decode unit 16 also detects the register operands used by the instruction and requests these operands from reorder buffer 22 and register file 24. In one embodiment, execute units 18 are symmetrical execution units. Symmetrical execution units are each configured to execute a particular subset of the instruction set employed by processor 10. The subsets of the instruction set executed by each of the symmetrical execution units are the same. In another embodiment, execute units 18 are symmetrical execution units configured to execute dissimilar instruction subsets. For example, execute units 18 may include a branch execute unit for executing branch instructions, one or more arithmetic/logic units for executing arithmetic and logical instructions, and one or more floating point units for executing floating point instructions. Decode unit 16 dispatches an instruction to a reservation station 17 which is coupled to an execute unit 18 or load/store unit 20 which is configured to execute that instruction.

Microcode unit 28 is included for handling instructions for which the architecturally defined operation is more complex than the hardware employed within execute units 18 and load/store unit 20 may handle. Microcode unit 28 parses the complex instruction into multiple instructions which execute units 18 and load/store unit 20 are capable of executing.

Load/store unit 20 provides an interface between execute units 18 and data cache 14. Load and store memory operations are performed by load/store unit 20 to data cache 14. Additionally, memory dependencies between load and store memory operations are detected and handled by load/store unit 20. Generally speaking, a "memory operation" is performed to transfer data between the main memory and processor 10. A load memory operation specifies the transfer of data from one or more memory locations within the main memory to processor 10. On the other hand, a store memory operation specifies the transfer of data from processor 10 to one or more memory locations within the main memory. The memory location or locations accessed by a given memory operation are identified within the main memory by an address corresponding to the given memory operation. A memory operation may be an implicit part of an instruction which performs an operation upon a memory operand, or may be the explicit operation of an instruction (i.e. the instruction performs data movement only). When an instruction includes a memory operation, one or more of the operands of the instruction are used to generate the address of the memory operation. These operands are referred to as "address operands" and may be register operands as well as immediate/displacement data from the instruction encoding itself.

Reservation stations 17 are configured to store instructions whose operands have not yet been provided. An instruction is selected from those stored in a reservation station 17A–17C for execution if: (1) the operands of the instruction have been provided, and (2) the instructions within the reservation station 17A–17C which are prior to the instruction being selected in program order have not yet received operands. It is noted that a centralized reservation station may be included instead of separate reservations stations. The centralized reservation station is coupled between decode unit 16, execute units 18, and load/store unit 20. Such an embodiment may perform the dispatch function within the centralized reservation station.

Processor 10 supports out of order execution, and employs reorder buffer 22 for storing execution results of speculatively executed instructions and storing these results into register file 24 in program order, for performing dependency checking and register renaming, and for providing for mispredicted branch and exception recovery. When an instruction is decoded by decode unit 16, requests for register operands are conveyed to reorder buffer 22 and register file 24. In response to the register operand requests, one of three values is transferred to the reservation station 17A–17C which receives the instruction: (1) the value stored in reorder buffer 22, if the value has been speculatively generated; (2) a tag identifying a location within reorder buffer 22 which will store the result, if the value has not been speculatively generated; or (3) the value stored in the register within register file 24, if no instructions within reorder buffer 22 modify the register. Additionally, a storage location within reorder buffer 22 is allocated for storing the results of the instruction being decoded by decode unit 16. The storage location is identified by a tag, which is conveyed to the unit receiving the instruction. It is noted that, if more than one reorder buffer storage location is allocated for storing results corresponding to a particular register, the value or tag corresponding to the last result in program order is conveyed in response to a register operand request for that particular register.

When execute units 18 or load/store unit 20 execute an instruction, the tag assigned to the instruction by reorder buffer 22 is conveyed upon result bus 30 along with the result of the instruction. Reorder buffer 22 stores the result in the indicated storage location. Additionally, reservation stations 17 compare the tags conveyed upon result bus 30 with tags of operands for instructions stored therein. If a match occurs, the unit captures the result from result bus 30 and stores it with the corresponding instruction. In this manner, an instruction may receive the operands it is intended to operate upon. Capturing results from result bus 30 for use by instructions is referred to as "result forwarding".

Instruction results are stored into register file 24 by reorder buffer 22 in program order. Storing the results of an instruction and deleting the instruction from reorder buffer 22 is referred to as "retiring" the instruction. By retiring the instructions in program order, recovery from incorrect speculative execution may be performed. For example, if an instruction is subsequent to a branch instruction whose taken/not taken prediction is incorrect, then the instruction may be executed incorrectly. When a mispredicted branch instruction or an instruction which causes an exception is detected, reorder buffer 22 discards the instructions subsequent to the mispredicted branch instructions. Instructions thus discarded are also flushed from reservation stations 17, execute units 18, load/store unit 20, and decode unit 16.

Register file 24 includes storage locations for each register defined by the processor architecture employed by processor 10. For example, processor 10 may employ the x86 processor architecture. For such an embodiment, register file 24 includes locations for storing the EAX, EBX, ECX, EDX, ESI, EDI, ESP, and EBP register values.

Data cache 14 is a high speed cache memory configured to store data to be operated upon by processor 10. It is noted that data cache 14 may be configured into a variety of configurations including a set-associative or direct-mapped configuration. Data cache 14 allocates and deallocates storage for data in cache lines. In other words, a cache line is a block of contiguous bytes which is allocated and deallocated from a cache as a unit. Data cache 14 further includes DTLB 36 for storing data address translations from a virtual address (e.g. a linear address) to a physical address.

Bus interface unit 32 effects communication between processor 10 and devices coupled thereto via CPU bus 224. For example, instruction fetches which miss instruction cache 12 may be transferred from a main memory by bus interface unit 32. Similarly, data requests performed by load/store unit 20 which miss data cache 14 may be transferred from main memory by bus interface unit 32. Additionally, data cache 14 may discard a cache line of data which has been modified by processor 10. Bus interface unit 32 transfers the modified line to the main memory.

It is noted that decode unit 16 may be configured to dispatch an instruction to more than one execution unit. For example, in embodiments of processor 10 which employ the x86 processor architecture, certain instructions may operate upon memory operands. Executing such an instruction involves transferring the memory operand from data cache 14, executing the instruction, and transferring tie result to memory (if the destination operand is a memory location) or data cache 14. Load/store unit 20 performs the memory operations, and an execute unit 18 performs the execution of the instruction.

Figure 4:
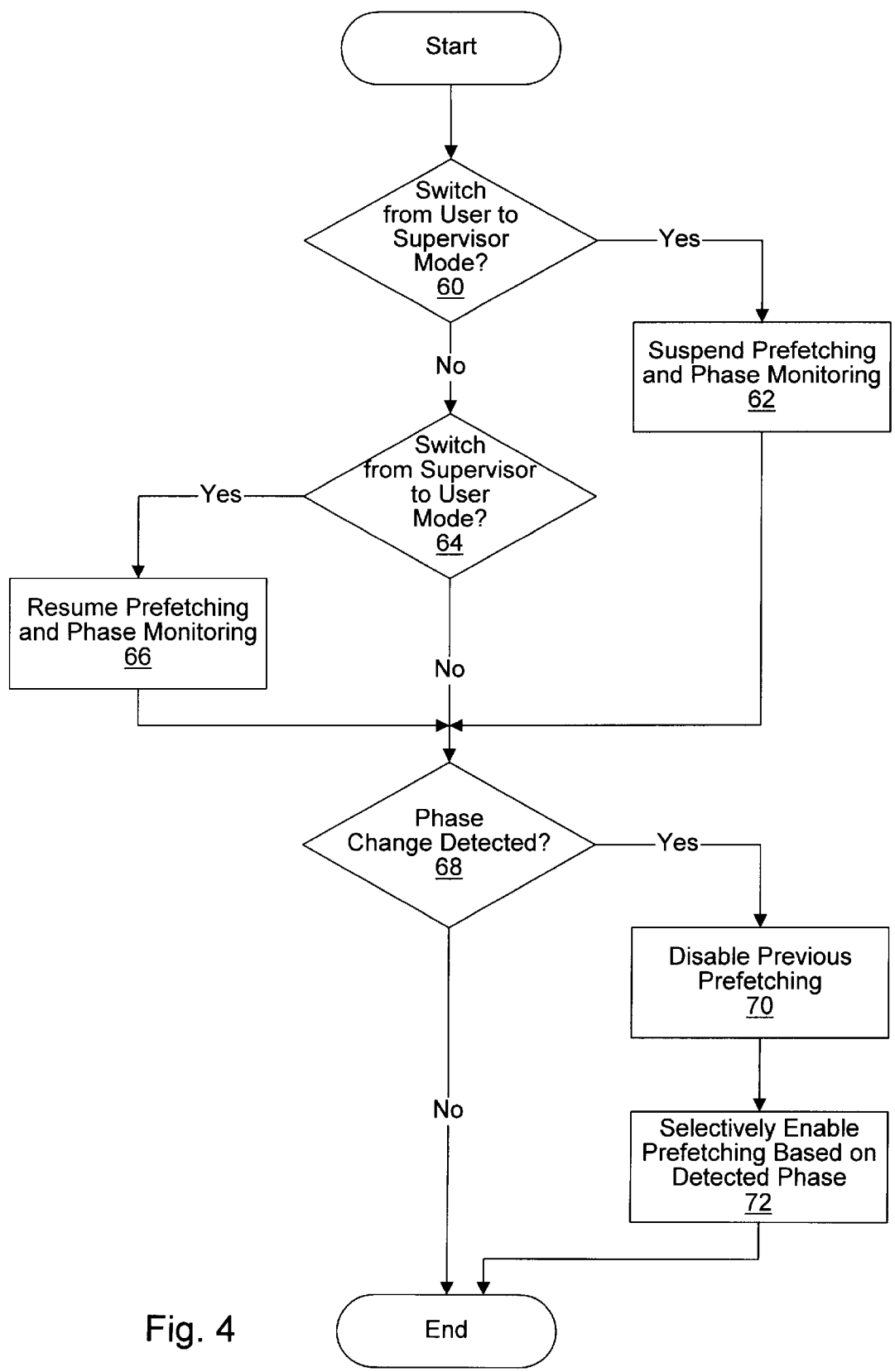
FIG. 4 is a flowchart illustrating operation of one embodiment of a phase change monitor shown in FIG. 1.

Turning next to FIG. 4, a flowchart is shown illustrating operation of one embodiment of phase change monitor 26. Other embodiments are possible and contemplated. Although certain steps may be shown in a serial fashion for ease of understanding, any suitable order may be used. Furthermore, steps may be implemented in a parallel fashion within the circuitry of phase change monitor 26, as desired.

Phase change monitor 26 determines whether or not a switch from user mode to supervisor mode is detected (decision block 60). Supervisor mode is generally used by the operating system, while user mode is generally used by the application programs. In supervisor mode, access to certain protected processor resources (such as control and configuration registers) may be permitted. Access to the protected processor resources is prohibited in user mode. As noted above, the operating system typically does not operate upon the data operated upon by the application program. Therefore, prefetching based on the phase of the application program may be of little use while the operating system is executing. Furthermore, monitoring the operating system code may result in detection of a phase change which is not a phase of the application program. The mode of the processor is often stored in a control register (e.g. as a bit indicating supervisor mode in one state and user mode in another state). Phase change monitor 26 may monitor the state of the mode stored in the control register to detect changes in processor mode.

If a transition from user to supervisor mode is detected, phase change monitor 26 suspends prefetching and phase monitoring activities (step 62). Phase change monitor 26 may signal prefetch unit 27 to suspend prefetching, and may internally suspend phase monitoring.

Phase change monitor 26 further monitors for a switch from supervisor to user mode (decision block 64). If a transition from supervisor to user mode is detected phase change monitor 26 resumes prefetching and phase monitoring activities (step 66).

Assuming phase monitoring is not in suspension (e.g. step 62), phase change monitor 26 monitors various processor resources to detect a phase change. One embodiment of phase change monitor 26 monitors the processor resources and detects a phase change according to the table shown in FIG. 5 below. If a phase change is detected (decision block 68), phase change monitor 26 may take several actions in the present embodiment. First, since any prefetching currently in progress was generated responsive to a phase being exited and may not be useful in the new phase, phase change monitor 26 may signal prefetch unit 27 to disable the current prefetching (step 70). In this fashion, prefetching which has a lower likelihood of being useful is inhibited. The prefetching does not, for example, consume bus bandwidth which may be used for other purposes. Additionally, phase change monitor 26 may signal prefetch unit 27 with information regarding the phase being entered. A prefetch for the phase being entered may thereby be selectively enabled (step 72).

Turning next to FIG. 5, a table 80 is shown illustrating processor resources monitored according to one particular embodiment of phase change monitor 26. Other embodiments are possible and contemplated. For example, any desired subset of the resources (and parameters of those resources) shown in table 80 may be monitored, as well as any desired subset in combination with resources or parameters thereof which are not shown in FIG. 5, as well as a set of resources and parameters thereof not shown in FIG. 5.

According to the embodiment illustrated by table 80, phase change monitor 26 monitors ITLB 34, reorder buffer 22, DTLB 36, instruction cache 12, data cache 14, and decode unit 16. With respect to ITLB 34, DTLB 36, instruction cache 12, and data cache 14, miss rates are monitored. Each resource may provide hit and miss indications to phase change monitor 26, which may use the indications to determine miss rates. Reorder buffer 22 provides indications of correct and mispredicted branches and a reorder buffer depth (i.e. number of instructions represented by entries allocated within reorder buffer 22). Decode unit 16 provides indications of whether floating point, multimedia, or integer instructions are decoded. The frequency of floating point, multimedia, and integer may thereby be determined. Furthermore, decode unit 16 may provide an indication that a branch instruction is being decoded, and whether or not the branch instruction includes a negative relative displacement. Frequencies of branch instructions having a negative relative displacement may thereby be determined. As used herein, a "floating point" instruction is an instruction which operates upon floating point operands (i.e. numeric values represented by a sign, exponent, and significand). A "multimedia instruction" is an instruction optimized for multimedia (e.g. audio and/or video) manipulations. For example, the MMX instructions in the x86 instruction set and the AMD 3D instructions developed by Advanced Micro Devices, Inc., may be multimedia instructions. "Integer" instructions are instructions which operate upon integer operands (i.e. numeric values represented by a value only, with the decimal point in a predefined position such as to the right of the least significant digit). Integer instructions may include arithmetic operations, logical operations, shifts and rotates, and branch operations.

Each row of table 80 defines a change in processor resource parameters or usage and the corresponding prefetch modification. For example, phase change monitor 26 may monitor the miss rate of ITLB 34. If the miss rate exceeds a predetermined threshold, then a phase change may be occurring. Increases in ITLB miss rate may indicate that code sequences in pages not previously accessed by the processor are occurring, and hence code not previously executed is being accessed. In one embodiment, a suitable threshold level for ITLB miss rate may be 5%. Upon detecting a miss rate exceeding the threshold, phase change monitor 26 disables the current prefetch (e.g. by signalling prefetch unit 27 that a phase change is occurring). Phase change monitor 26 may direct that instruction prefetching be initiated, since new pages are being accessed (causing the ITLB misses), if desired.

Similarly, if the miss rate of DTLB 36 exceeds a predetermined threshold, a phase change may be occurring. For example, a new data set may be being accessed. A suitable threshold level for DTLB miss rate may be 5%. In response to the miss rate exceeding a particular level, phase change monitor 26 disabled the current prefetch. Additionally, prefetches of data within the pages which miss DTLB 36 may be enabled.

Phase change monitor 26 may detect that branch misprediction rates determined from reorder buffer 22 exceed a predetermined threshold of, for example, 5%. If branch mispredictions are occurring more frequently, then a phase change may be occurring and the previously observed branch behavior (used to form the branch predictions) may be incorrectly predicting the branches. Responsive to this detection of a phase change, phase change monitor 26 may disable the current prefetch. However, this detection does not indicate a particular prefetch to initiate. Accordingly, phase change monitor 26 may not initiate a prefetch responsive to this phase change detection. Detecting a phase change of this type may also be used to invalidate branch prediction information corresponding to a previous phase, if desired.

Phase change monitor 26 may monitor instruction cache 12 and data cache 14 miss rates. If the miss rates exceed a predetermined threshold of, for example, 5%, then a phase change may be occurring. Cache miss rates may be indicative of phase changes in a manner similar to TLB miss rates. Responsive to detection of a phase change via cache miss rates, the current prefetch may be disabled and prefetch may be initiated for cache lines which miss the cache whose miss rate exceeded the threshold.

Phase change monitor 26 may further monitor reorder buffer depth. Reorder buffer depth (i.e. the number of entries reserved for speculative instruction execution results) may indicate a phase change in several ways. For example, phase changes may often include a variety of synchronizing operations which may cause instruction throughput to decrease during the phase change. However, instruction fetching may proceed at normal pace, increasing the number of instructions represented within the reorder buffer. Furthermore, reorder buffer depth may increase as miss rates in the caches and TLBs increase. Instructions which access the missing cache lines or pages are stalled, as are instructions which depend upon those instructions. If reorder buffer depth exceeds a predetermined threshold (for example, 50% of the total available reorder buffer entries), then the current prefetch may be disabled. Similar to branch misprediction exceeding a particular threshold, reorder buffer depth may not indicate a particular prefetch to be initiated.

Decode unit 16 provides signals indicating whether floating point, multimedia, and integer instructions are being decoded. Phase change monitor 26 may thereby determine absolute or relative frequencies of floating point and multimedia instructions to integer instructions. If, for example, the frequency of floating point instructions exceeds a predetermined threshold, then a floating point intensive phase may be starting. Similarly, if the frequency of multimedia instructions exceeds a predetermined threshold, then a multimedia intensive phase may be starting. If the frequencies of these instructions fall below the threshold, then a phase which is not floating point or multimedia intensive may be starting. Accordingly, phase change monitor 26 may monitor for changes in the frequency of floating point and multimedia instructions which cause the frequency to exceed or fall below the predetermined threshold.

If the frequency of floating point instructions exceeds the threshold (for example, 30% of the total instructions may be suitable), then the current prefetching may be disabled. Furthermore, since the phase being entered is floating point intensive, prefetching of floating point data accesses may be initiated (i.e. prefetching responsive to floating point data accesses and inhibiting prefetch for other types of data accesses). Similarly, if the frequency of multimedia instruction exceeds the threshold (for example, 30% of the total instructions may be suitable), then the current prefetching may be disabled and prefetching of multimedia type data accesses may be initiated. On the other hand, if the frequency of both floating point and multimedia instructions falls below the threshold, a phase change to an integer intensive phase may be occurring. Accordingly, the current prefetch may be disabled and prefetch of integer data accesses may be initiated.

Finally, phase change monitor 26 may be configured to determine the frequency of branch instructions having negative relative displacements responsive to signals from decode unit 16. If the frequency of branches having negative relative displacements exceeds a threshold of, for example, 50% of all branches, then a loop may be in progress (i.e. the same negative displacement branch is being encountered repeatedly). Responsive to the frequency exceeding the threshold, the current prefetch may be disabled and prefetch of subsequent misses may be selectively enabled based on the loop count. If the loop count is large, prefetch may be enabled. Conversely, a small loop count indicates the loop will exit soon and therefore prefetching may not be enabled.

It is noted that, while exemplary threshold values were given in the above description, any suitable threshold values may be selected without departing from the spirit and scope of the appended claims. It is further noted that phase change monitor is configured to monitor for changes in a parameter of a processor resource which cause a threshold to be exceeded (or fallen below). If a parameter changes but remains in excess of the threshold or remains below the threshold, a phase change is not being detected (i.e. the program may still be within the same phase). Accordingly, it is changes which cross the threshold which are indicative of phase changes.

Other adaptations of prefetching to the phases of an application program are contemplated as well. For example, upon detection of a phase change to floating point intensive code, prefetching of the next sequential cache line may be performed upon each cache miss. Frequently, floating point code performs a set of data accesses to sequential addresses (e.g. accessing the elements of an array) over a large data set, and hence the next sequential cache line may be likely to be accessed. Multimedia code may also be likely to accesses sequential addresses, but multimedia instruction (in one embodiment) are single instruction, multiple data instructions which operate on numerous values simultaneously. Accordingly, multimedia code may more rapidly progress through the sequential addresses. Therefore, upon detection of a phase change to multimedia intensive code, prefetching of the next two sequential cache lines may be performed upon each cache miss.

Figure 6:
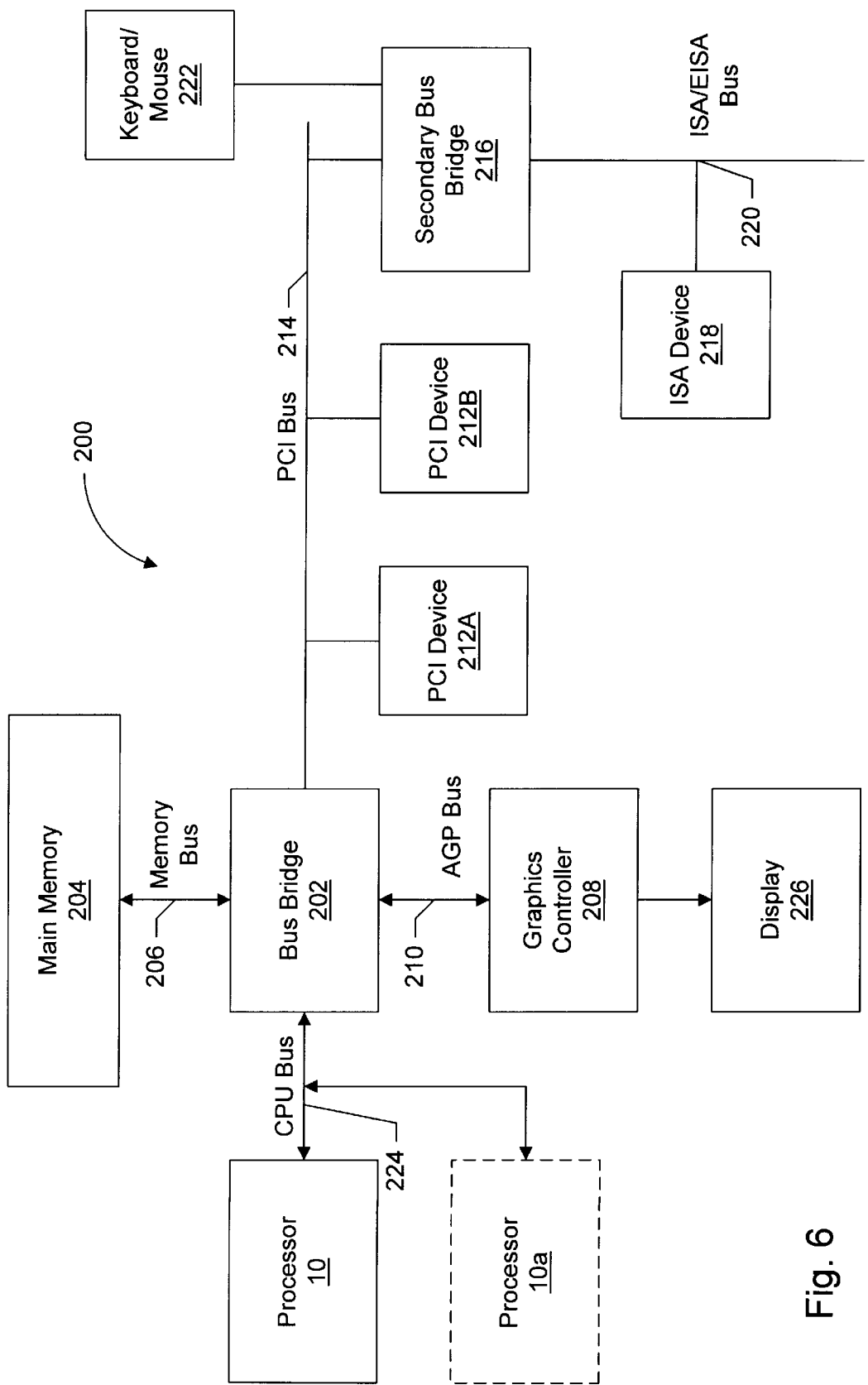
FIG. 6 is a computer system including the processor shown in FIG. 1.

Turning now to FIG. 6, a block diagram of one embodiment of a computer system 200 including processor 10 coupled to a variety of system components through a bus bridge 202 is shown. Other embodiments are possible and contemplated. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Processor 10 is coupled to bus bridge 202 through a CPU bus 224.

Bus bridge 202 provides an interface between processor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. For example, in one embodiment, secondary bus bridge 216 includes a master PCI arbiter (not shown) for arbitrating ownership of PCI bus 214. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to CPU bus 224 between processor 10 and bus bridge 202 in other embodiments. Alternatively, the external cache may be coupled to bus bridge 202 and cache control logic for the external cache may be integrated into bus bridge 202.

Main memory 204 is a memory in which application programs are stored and from which processor 10 primarily executes. A suitable main memory 204 comprises DRAM (Dynamic Random Access Memory), and preferably a plurality of banks of SDRAM (Synchronous DRAM).

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional processors (e.g. processor 10a shown as an optional component of computer system 200). Processor 10a may be similar to processor 10. More particularly, processor 10a may be an identical copy of processor 10. Processor 10a may share CPU bus 224 with processor 10 (as shown in FIG. 6) or may be connected to bus bridge 202 via an independent bus.

In accordance with the above disclosure, a processor has been shown which monitors execution of a program to detect that phase changes are occurring. If a phase change is detected, prefetching may be selectively enabled or disabled based upon the new phase. Prefetching may be tailored to program phase, allowing prefetching to be more accurate to the phase being executed.

Numerous variations and modifications will become apparent to those skilled in the art once the above disclosure is fully appreciated. It is intended that the following claims be interpreted to embrace all such variations and modifications.

What is claimed is:

1. A processor comprising:
    one or more processor resources;
    a phase change monitor coupled to said processor resources, wherein said phase change monitor is configured to detect a phase change in a program being executed by monitoring said processor resources, wherein at least one of said processor resources provides a hit/miss indication to said phase change monitor, wherein said phase change monitor is configured to detect said phase change responsive to said indication; and
    a prefetch unit coupled to said phase change monitor, wherein said prefetch unit is configured to selectively prefetch responsive to said phase change monitor.

2. The processor as recited in claim 1 wherein said phase change monitor is configured to cause said prefetch unit to disable a current prefetch upon detecting said phase change.

3. The processor as recited in claim 1 wherein said phase change monitor is configured to cause said prefetch unit to enable a prefetch corresponding to a phase being entered upon detection of said phase change.

4. The processor as recited in claim 1 wherein said one or more processor resources comprises a decode unit configured to decode instructions, and wherein said phase change monitor is configured to detect said phase change upon a frequency of floating point instructions decoded by said decode unit crossing a predetermined threshold value.

5. The processor as recited in claim 1 wherein said one or more processor resources comprises a decode unit configured to decode instructions, and wherein said phase change monitor is configured to detect said phase change upon a frequency of multimedia instructions decoded by said decode unit crossing a predetermined threshold value.

6. The processor as recited in claim 1 wherein said one or more processor resources comprises a translation lookaside buffer configured to translate addresses to physical addresses, and wherein said phase change monitor is configured to detect said phase change upon a miss rate experienced by said translation lookaside buffer exceeding a predetermined threshold value.

7. The processor as recited in claim 1 wherein said one or more processor resources comprises a cache configured to store cache lines of memory, and wherein said phase change monitor is configured to detect said phase change upon a miss rate experienced by said cache exceeding a predetermined threshold value.

8. The processor as recited in claim 1 wherein said one or more processor resources comprises a reorder buffer configured to store speculative instruction results, and wherein said phase change monitor is configured to detect said phase change upon a number of entries within said reorder buffer reserved for said speculative instruction results exceeding a predetermined threshold value.

9. The processor as recited in claim 1 wherein said one or more processor resources comprises a reorder buffer configured to receive branch misprediction indications upon execution of branch instructions which are mispredicted, and wherein said phase change monitor is configured to detect said phase change upon a rate of said branch misprediction indications exceeding a predetermined threshold value.

10. The processor as recited in claim 1 wherein said one or more processor resources comprises a decode unit configured to decode instructions, and wherein said phase change monitor is configured to detect said phase change upon a frequency of branch instructions having a negative displacement decoded by said decode unit exceeding a predetermined threshold value.

11. The processor as recited in claim 1 wherein said phase change unit is configured to detect a first change in a processor mode from user to supervisor, and wherein said phase change unit is configured to suspend monitoring said processor resources and prefetching responsive to said first change.

12. The processor as recited in claim 11 wherein said phase change unit is configured to detect a second change in said processor mode from supervisor to user, and wherein said phase change unit is configured to resume monitoring said processor resources and prefetching responsive to said second change.

13. A method for prefetching in a processor executing a program, comprising:
    monitoring one or more processor resources, wherein at least one of said processor resources provide a hit/miss indication, wherein said hit/miss indication is used to detect a phase change in said program; and
    selectively enabling a prefetch responsive to said phase change.

14. The method as recited in claim 13 further comprising disabling a previously enabled prefetch responsive to said phase change.

15. The method as recited in claim 13 further comprising:
    detecting a switch from user mode to supervisor mode within said processor; and
    suspending said monitoring and said selectively enabling responsive to said detecting.

16. The method as recited in claim 13 further comprising:
    detecting a switch from supervisor mode to user mode within said processor; and
    resuming said monitoring and said selectively enabling responsive to said detecting.

17. A computer system comprising:

a processor configured to execute a program, wherein said processor is configured to monitor one or more processor resources to detect a phase change in said program, wherein at least one of said processor resources provides a hit/miss indication to said processor, wherein said processor is configured to detect said phase change from said indication, wherein said processor is configured to selectively prefetch responsive to detecting said phase change;

a memory coupled to said processor, wherein said memory is configured to store instructions and data for access by said processor; and an input/output (I/O) device coupled to said processor, wherein said I/O device is configured to communicate between said computer system and a second computer system coupled to said I/O device.

18. The computer system as recited in claim 17 further comprising a second processor coupled to said memory and to said I/O device, wherein said second processor is configured to execute said program, and wherein said second processor is configured to monitor one or more processor resources to detect said phase change in said program, and wherein said second processor is configured to selectively prefetch responsive to detecting said phase change.

* * * * *